United States Patent
Koziol

(12) 
(10) Patent No.: US 6,203,128 B1
(45) Date of Patent: *Mar. 20, 2001

(54) MOUNTING RECEPTACLE FOR RECORDS AND CASSETTES

(76) Inventor: Stephan Koziol, Werner-von-Siemens-Strasse 90, 6120 Erbach/Odenwald (DE)

( * ) Notice: Subject to any disclaimer, the term of this patent is extended or adjusted under 35 U.S.C. 154(b) by 0 days.

This patent is subject to a terminal disclaimer.

(21) Appl. No.: 08/039,312
(22) PCT Filed: Aug. 17, 1992
(86) PCT No.: PCT/DE92/00696
§ 371 Date: Jun. 1, 1993
§ 102(e) Date: Jun. 1, 1993
(87) PCT Pub. No.: WO93/04474
PCT Pub. Date: Mar. 4, 1993

(30) Foreign Application Priority Data

Aug. 15, 1991 (DE) .............................. 91 10 070 U

(51) Int. Cl.$^7$ ...................................................... A47B 81/06
(52) U.S. Cl. ............................................................ 312/9.48
(58) Field of Search .................................. 312/9.46–9.48, 312/107, 108, 111; 248/601

(56) References Cited

U.S. PATENT DOCUMENTS 3,563,624 * 2/1971 Stice ...................................... 312/111

FOREIGN PATENT DOCUMENTS

0155601 * 9/1985 (EP) .

* cited by examiner

Primary Examiner—Michael Buiz

(57) ABSTRACT

A mounting receptacle for records and cassettes has at least two elements which are arranged near one another and provided with receiving devices for records and cassettes to be inserted, a first wall and a second wall provided in each of the elements and parts for connecting the elements securely and detachably in the region of the first wall and the second wall. The connecting parts include at least one bayonet screw having a screw neck with one end provided with a head and another end provided with a cam-like bayonet shoulder, and overlapping bore holes provided in the second wall and the first wall of the elements so that the bayonet screw can be inserted in the overlapping bore holes of the second wall and the first wall of the elements and being flush with surfaces of the second wall and the first wall on insides of the elements without projecting out. The bore hole in the second wall on the inside of the elements reaches a thickness of the screw head and has a diameter corresponding to a diameter of the screw head and also tapers in a portion of the second wall to a maximum diameter of the screw neck including the bayonet shoulder. The bore hole in the first wall on the inside of the elements has a diameter of the screw neck of the bayonet screw including the bayonet shoulders, the connecting member also including cam-like projections which project into the bore hole in the region directed toward the outside of the elements, the bayonet shoulders of the bayonet screw engaging under the cam-like projections.

3 Claims, 4 Drawing Sheets

MOUNTING RECEPTACLE FOR RECORDS AND CASSETTES

BACKGROUND OF THE INVENTION

The invention concerns a receptacle for assembling and storing records, particularly compact disks, as well as audio and/or video cassettes which can be expanded by mounting or adding on additional elements (boxes).

In addition to commercially available receptacles for records and/or cassettes which are constructed from the start only for a fixed number of records or cassettes and cannot be expanded, receptacles are also known which are capable of expansion. In the latter, a plurality of elements are placed either on top of or next to one another. However, there is no secure connection of these elements. At best, there are positioning pins and positioning bore holes or fastening strips in the region where one element is placed on top of another. The disadvantage of these receptacles therefore consists in the absence of a fixed and permanent connection. In particular, one element added on top of another can be easily upset and fall over. This risk is posed in particular when an element placed on top of another is top-heavy due to only partial filling with records, etc. and when the user removes the sound recording.

SUMMARY OF THE INVENTION

The present invention has the object of providing a receptacle of the type indicated above in which a fixed and permanent, but detachable, connection of the mounted or added on elements is effected, in which the useful space of the receptacle and elements is not limited or obstructed by projecting connection parts, and in which the connection can be effected effortlessly, also by nontechnical persons.

In keeping with these objects and with others which will become apparent hereinafter, one feature of the present invention resides, briefly stated, in a mounting or add-on receptacle for records and cassettes including two or more elements which are set one on top of the other or added on to one another and have receiving devices for the records and cassettes to be inserted, wherein in accordance with the present invention the elements are securely but detachably connected in the region of the cover end base by one or more bayonet screws, the bayonet screw has a flat hat and at its opposite end at least one cam-like bayonet shoulder at the screw neck and is inserted in overlapping bore holes of the base and of the cover of the elements and is flush with the surfaces of the base and cover on the inside of the elements without projecting out, the bore hole in the base on the inside of the elements which reaches the height/thickness of the screw head has the diameter of the latter and tapers in the portion of the base adjoining the latter to the maximum diameter of the screw neck, including the bayonet shoulders, while the bore hole in the cover on the inside of the element has the diameter of the screw neck of the bayonet screw, including the bayonet shoulders, and cam-like projections project into the latter in the region directed toward the outside of the elements, while the bayonet shoulders of the bayonet screw engage under the cam-like projections.

When the mounting receptacle for records or cassettes is designed in accordance with the present invention, it eliminates the disadvantages of the prior art and provides for the above identified highly advantageous results.

In accordance with another feature of the present invention the two elements have a plurality of connections by means of the bayonet screws, the latter being inserted reciprocally into the base from inside of the elements on the one hand and into the cover from the inside of the elements on the other hand, so that additional bore holes are arranged in the cover which are shaped like the bore holes, and bore holes corresponding to the first mentioned bore holes are arranged in the base.

In accordance with still another feature of the present invention, the receptacle can have two or more laterally adjoining elements which are connected with the adjacent outer walls of the elements by one or more bayonet screws via bore holes.

Finally, the bayonet screw and the screw head can have a widened slot for inserting a coin.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
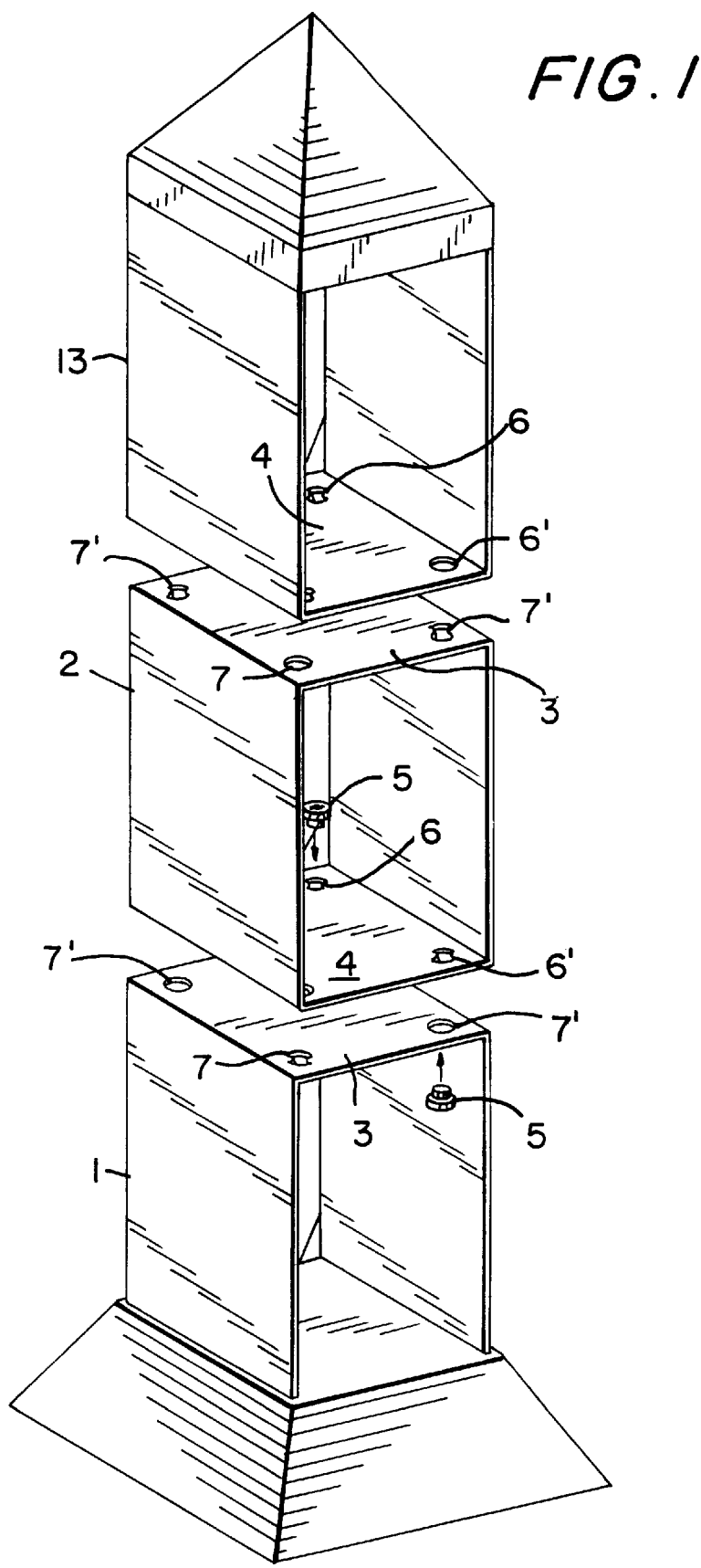
FIG. 1 is a schematic view of the mounting receptacle according to the invention with three elements prior to connection.
Figure 2:
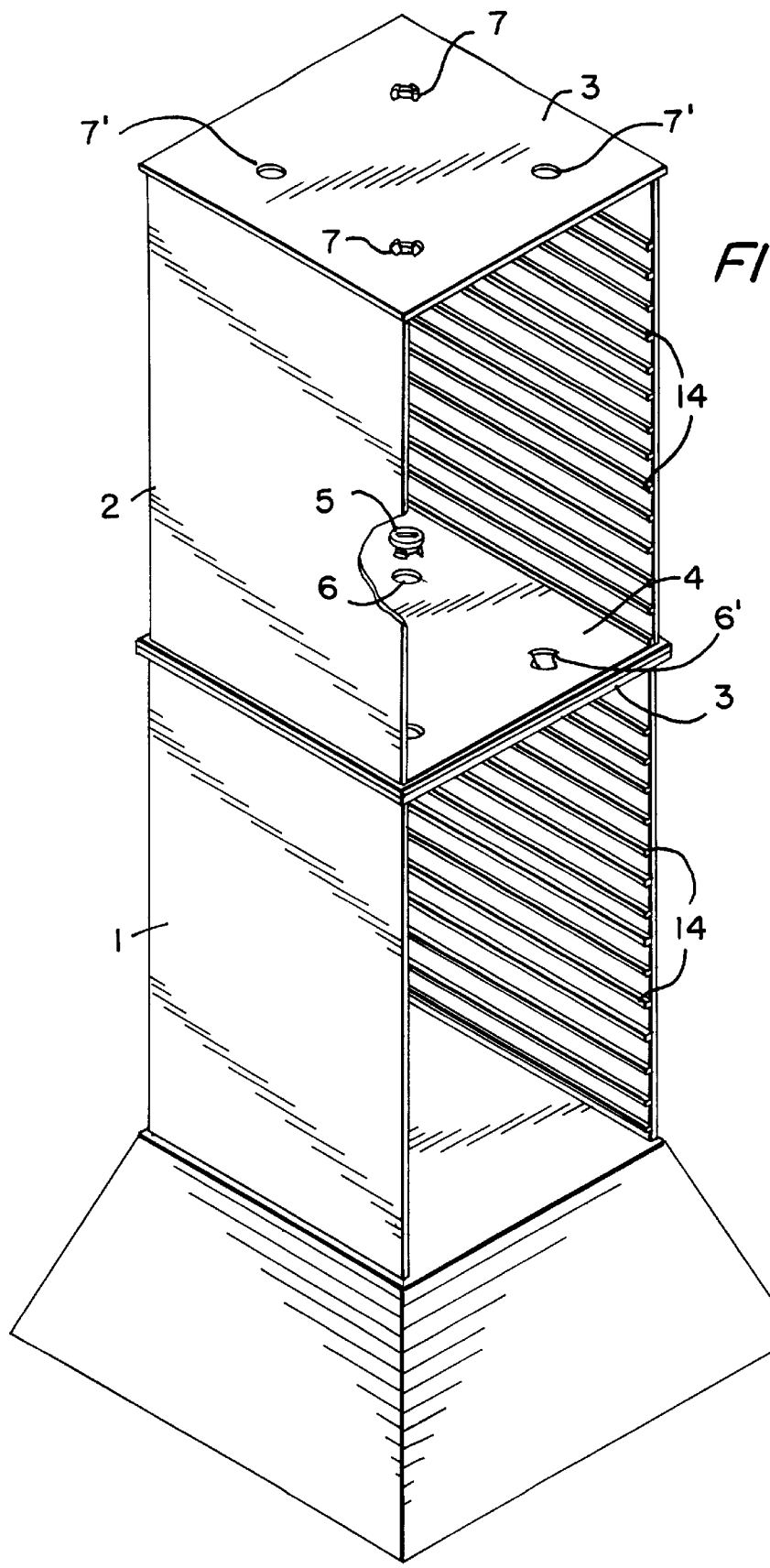
FIG. 2 shows the mounting receptacle according to the invention with two elements in the assembled state.
Figure 3:
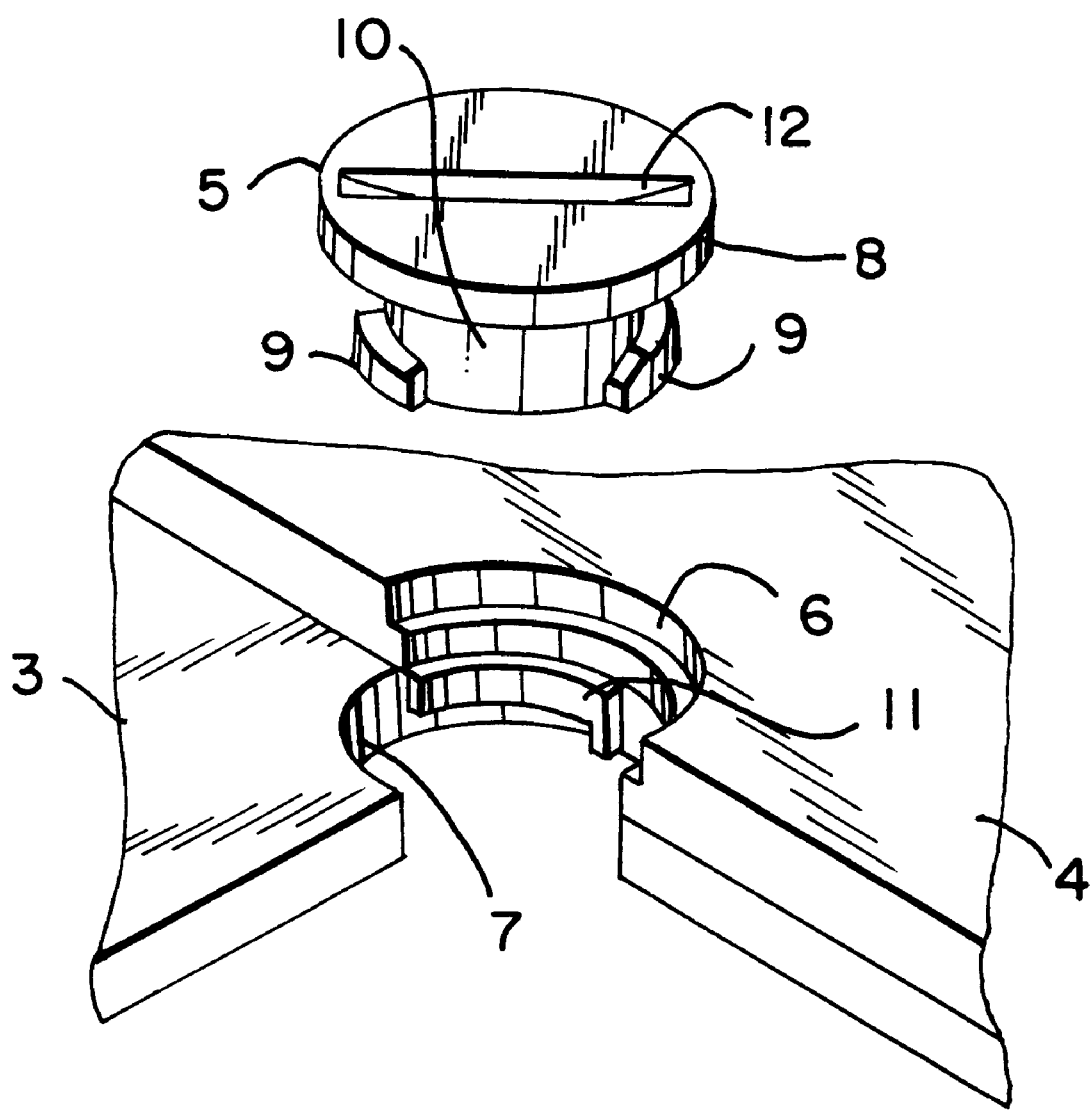
FIG. 3 is a detail from FIGS. 1 and 2 showing a bayonet screw and the bore holes in two elements placed one on top of the other prior to insertion of the bayonet screw.
Figure 4:
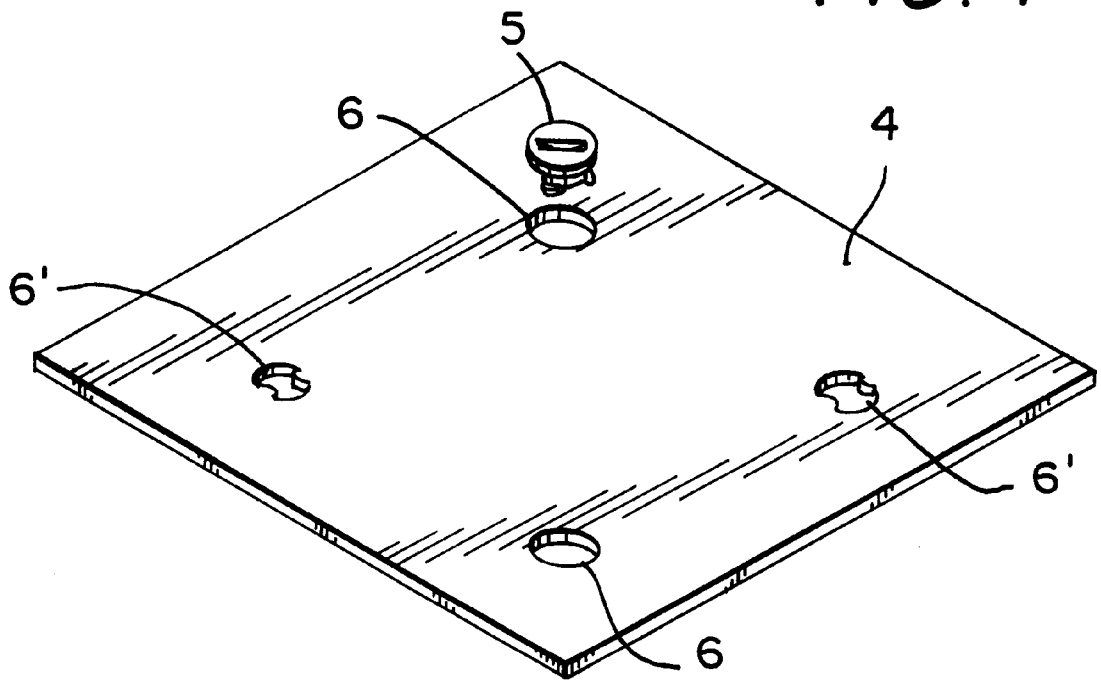
FIG. 4 shows the detail according to FIG. 3 with sections from the two elements prior to mounting.
Figure 4:
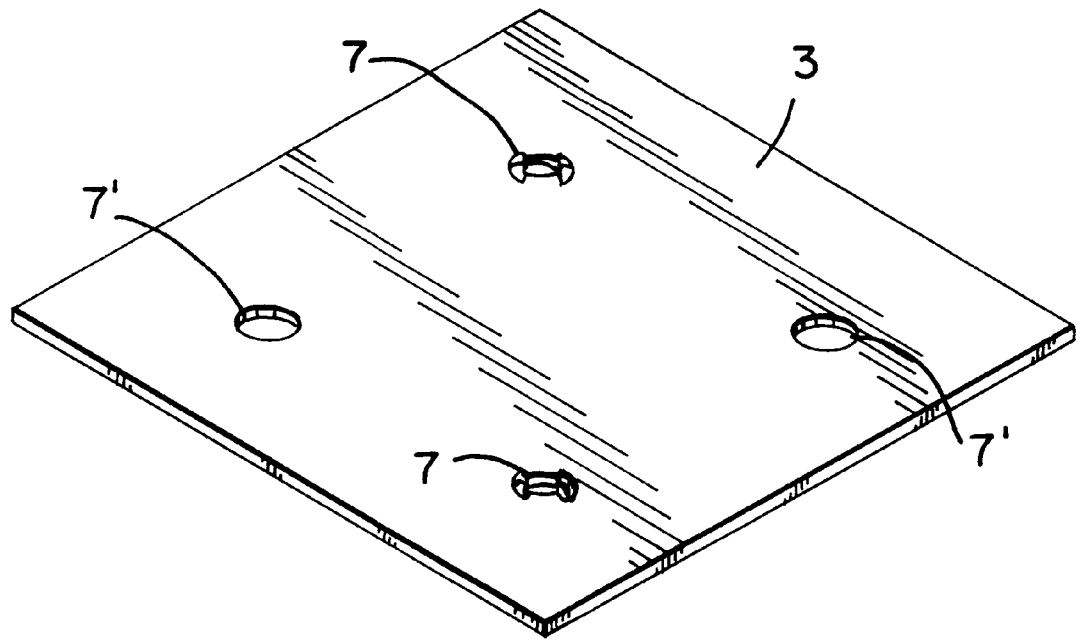

The receptacle according to be the invention which is shown in FIG. 2 includes the two elements (boxes) 1 and 2 to mounted. The receptacle according to the invention which is shown in FIG. 1 includes the three elements 1, 2 and 13 to be mounted. The elements are placed one on top of the other. The cover 3 of the elements 1, 2, 13 and the base 4 of elements 2 and 13 are plane surfaces. However, they can also be shaped in a different manner and likewise engage one inside the other in a positively locking manner. Elements 1 and 2 as well as 2 and 13 are securely but detachably connected in the region of the surfaces 3 and 4 by at least one bayonet screw, although four such bayonet screws are shown in the embodiment example which are guided through corresponding bore holes 6, 6' and 7, 7' in the cover 3 and the base 4.

The bayonet screw 5 has a flat head 8 and, at its opposite end, at least one, advantageously two, cam-like bayonet shoulders 9 at the screw neck 10.

The diameter of the bore hole 6 in the base 4 of the element 2 or 13 corresponds inside the elements to the diameter of the screw head 8, and the bore hole 6 reaches to a depth of the height/thickness of the screw head 8 so that the bayonet screw 5 is completely countersunk in the base 4 after being inserted therein. In the adjoining area, the bore hole 6 in the base 4 tapers to a diameter which corresponds to the maximum diameter of the screw neck 10 with the bayonet shoulders 9. The bore hole 7 in the cover 3 of the element 1 or 2, which is associated with the bore hole 6 of element 2 or 13 and corresponds to it, has a diameter inside the element 1 or 2 corresponding to that of the screw neck 10 of the bayonet screw 5 with the bayonet shoulders 9.

In the adjoining region of this bore hole, cam-like projections 11 project into the region of the bore hole toward the outside of the element 1 or 2. Bayonet shoulders 9 of the bayonet screw 5 engage under these cam-like projections 11 after the bayonet screw 5 is inserted into the elements 1 and 2 or 2 and 13 which are placed one on top of the other and after rotating the bayonet screw 5.

The length of the bayonet screw 5, including the screw head 8, corresponds at most to the combined thickness of the base 4 of the element 2, the cover 3 of the element 1 or of the base 4 of the element 13, and the cover 3 of the element 1 in the mounted state.

In an advantageous further development of the invention a plurality of connections are provided between the two elements 1 and 2 or 2 and 13 as is shown in FIGS. 1 and 2. The bore holes 6', 7' are arranged in a mirror-inverted manner relative to the bore holes 6, 7, e.g. bore hole 6' in the base 4 of the element 3 corresponds in shape to the bore hole 7 in the cover 3 of the element 1 and bore hole 7' of element 1 corresponds to bore hole 6 of element 2.

To further simplify assembly, the bayonet screw 5 is advantageously provided with a wider slot 12 in which it is possible to insert a coin or slug for turning.

After the bayonet screw 5 is inserted through the bore holes 6, 7 or 6', 7' of the elements 1 and 2 or 2 and 13 which are set one on top of the other and after the bayonet screw is rotated, the latter is flush at the insides of the cover 3 and base 4, i.e. does not project over the latter.

In the inventive receptacle with add-on elements, the bore holes are arranged in the two outer walls of the add-on elements to be connected with one another, rather than in the cover and base of elements 1, 2 and 13. In other respects the shape and arrangement of the bore holes and the bayonet screws conform to the construction in the receptacle with mounting elements.

To disassemble the receptacle or remove an element, it is only necessary to unlock and remove the bayonet screws.

The invention enables a mounting or add-on receptacle for records and cassettes in which two or more elements are connected securely and permanently, but so as to be easily detachable again. This stable connection is already achieved with only one bayonet screw which is guided through the corresponding bore holes of the cover and base of the two adjoining elements of the receptacle. Stability is further increased by selecting a plurality of such connections for two elements. Mounted or added-on elements cannot fall down when removing records or cassettes or as a result of impact or top-heaviness. Due to the construction of the bayonet screws and their insertion into the elements, the base and cover of the elements are completely planar even on their insides, since the bayonet screw does not project out on any side. The elements or the entire receptacle can be constructed or disassembled effortlessly, also by nontechnical persons. Not even a screwdriver is required when a suitably large slot is arranged in the bayonet screw. The design according to the invention makes it possible to produce mounting receptacles with a plurality of elements and with a record and cassette holding capacity which was not previously possible.

It will be understood that each of the elements described above, or two or more together, may also find a useful application in other types of constructions differing from the types described above.

While the invention has been illustrated and described as embodied in a mounting receptacle for records and cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A modular extendable container for records and cassettes, comprising at least two elements mounted one above the other and provided with means for carrying records and cassette to be laid in, said elements on a top surface of a top wall of one of said elements and under a bottom surface of a bottom wall of the other of said elements being tightly but detachably connected to each other; means for connecting said elements with each other including at least two bayonet screws, each of said bayonet screws having a flat head and at an opposite side at least one cam-type bayonet stud at a screw neck, said connecting means further including at least a borehole provided in a bottom surface of said top wall of said one element and at least a bore hole provided in a top surface of said bottom wall of said other element; said boreholes formed so that said bayonet screws are inserted in said boreholes and finishing on interior sides of said elements, with said top surface of said top wall of said one element and said bottom surface of said bottom wall of said other element flush, each of said boreholes having a diameter corresponding to a diameter of said flat head up to a height of said flat head and having a same diameter as said screw neck plus said bayonet stud; said borehole provided in said bottom surface of said top wall of said one element including cam-type projections reaching above and engaging said bayonet studs; said bayonet screws being inserted from said borehole in said top surface of said bottom wall of said other element into said borehole in said bottom surface of said top wall of said one element.

2. A modular as defined in claim 1, wherein said elements are arranged laterally near one another, said bottom wall of said other element and said top wall of said one element forming adjoining exterior walls with said boreholes through which said bayonet screws extend.

3. A modular as defined in claim 1, wherein each of said bayonet screws is provided in said flat head with a widened slot for insertion of a coin.

\* \* \* \* \*